Feb. 9, 1937.   R. S. HENDERSON   2,070,048
COMPOSITE ERASER
Filed Nov. 23, 1934

INVENTOR
Russell S. Henderson,
BY
George D. Richards,
ATTORNEY

Patented Feb. 9, 1937

2,070,048

UNITED STATES PATENT OFFICE 2,070,048

COMPOSITE ERASER

Russell S. Henderson, Morristown, N. J., assignor to Weldon Roberts Rubber Co., Newark, N. J., a corporation of New Jersey Application November 23, 1934, Serial No. 754,442

3 Claims. (Cl. 120—40)

This invention relates to improvements in erasers; and the invention has reference, more particularly, to a novel construction of composite eraser for general use, and one which is especially adapted to meet the eraser requirements of typists, draftsmen, accountants and like workers.

This invention has for its principal object to provide a composite eraser comprising a plurality of erasive materials (such e. g. as one of relatively soft character capable of a comparatively mild degree of abrasive action and another of relatively hard character capable of a comparatively strong abrasive action) arranged together in a novel relation to form a unitary eraser body, characterized by such novel distribution of the component materials throughout the mass, that sections of such materials are constantly adjacently exposed at the periphery of the body both initially and throughout its life while being worn down in use. With this object in view, the novel composite eraser body comprises alternate layers of different characters of erasive material, such e. g. as pencil erasive and ink erasive materials, preferably formed into parallel spirally disposed strips extending from a central portion outwardly throughout the body and terminating at the periphery of the latter in exposed adjacent peripheral or segmental sections, said layers being mutually bound together into a unitary mass, whereby the respective layers underlie one another in successive strata from the periphery toward the central portion of the body.

The invention has for further objects to provide a composite eraser of the kind described wherein the novel relation of the pencil and ink erasive materials so presents the same respectively at the working periphery of the eraser body that either one or the other thereof may be individually or separately used, or the same may be used together with combination effect; to so dispose the comparatively hard and strongly abrasive ink erasive material, where peripherally exposed for use, that a comparatively small mass thereof is operative, and this operative mass is resiliently backed by an underlying body of soft material, thereby cushioning the operative portion of such hard material so that although highly efficient erasive action is attained, less likelihood of undue disintegration or unnecessarily deep scratching of the paper surface occurs; and finally to furnish an eraser of novel and attractive appearance, as well as to obtain the above mentioned and other functional advantages, as will be understood from the following detailed description of this invention.

Illustrative embodiments of this invention are shown in the accompanying drawing, in which:—

Similar characters of reference are employed in the above-described views, to indicate corresponding parts.

Figure 1:
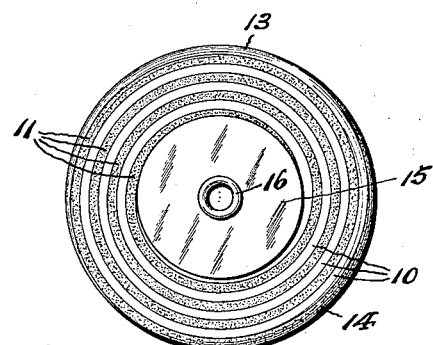
Fig. 1 is a side face view of the novel composite eraser according to this invention shown in circular form.
Figure 2:
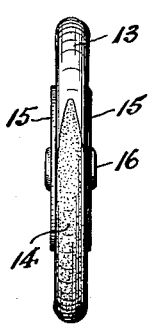
Fig. 2 is an edge elevation thereof.
Figure 3:
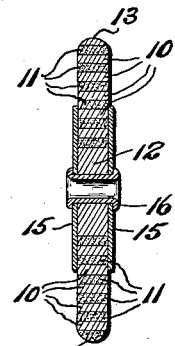
Fig. 3 is a transverse vertical section thereof.

Referring to the drawing, the novel composite eraser body comprises a layer or strip 10 of comparatively soft or mildly abrasive (e. g. pencil) erasive material and a layer or strip 11 of comparatively hard or strongly abrasive (e. g. ink) erasive material. These layers or strips are of a width corresponding to the width i. e. the thickness of the eraser body to be produced, and the same are superimposed flatwise one upon the other and then rolled endwise upon themselves, or upon a central core, as 12 (see Fig. 3), of tough or not easily torn or fracturable rubber material, to dispose the same in alternated spirally disposed strata extending outwardly to the periphery of the eraser body formed thereby. The body thus constituted is consolidated and bound into a unitary mass by any suitable method or means, as e. g. by vulcanization, thus producing a finished eraser body of conventional generally circular form, wherein outer terminal portions of the respective layers or strips are exposed at the periphery of the body, thereby forming adjoining peripheral sections or segments 13 and 14, respectively of soft or pencil erasive material and comparatively hard or ink erasive material. The eraser bodies thus produced may be completely finished by a molding process, or finally finished to remove rough edges therefrom and to smooth their exposed surfaces in the usual manner understood by those skilled in the art, viz. by tumbling the same. Eraser bodies of conventional circular form commonly employed for typewriter erasers, as shown in Figs. 1 to 4 inclusive, are usually provided with reinforcing side plates 15 of metal or of any suitable substantially rigid material, the same being secured together and to the body by a central riveting eyelet 16 which passes transversely through the center of the body, or through the central core 12 thereof when the latter is used. It will be understood that eraser body holders of the well known whisk or brush type (not shown) may also be used with the novel composite eraser bodies of this invention, if desired.

Figure 4:
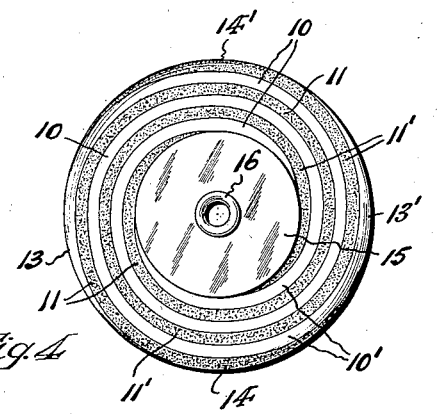
Fig. 4 is a side face view of a somewhat modified form of the novel composite eraser of circular body shape.

In Fig. 4 I have shown a circular composite eraser body comprising two sets of dual strips one comprising superimposed layers of pencil and ink erasive materials 10 and 11 and the other similar layers 10' and 11', the two sets being also superimposed one upon the other, and then together rolled endwise upon themselves to produce alternated spirally disposed strata of the two qualities of material, thereby producing additional operative sections or segments 13' and 14' at the periphery of the body formed thereby.

Figure 5:
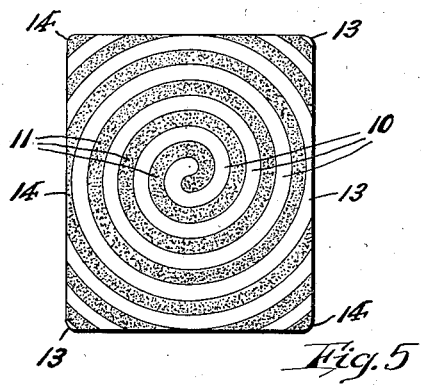
Figs. 5 to 7 inclusive show side face views of variously modified peripheral shapes of eraser body, all, however, embodying the composite eraser structure according to this invention.
Figure 6:
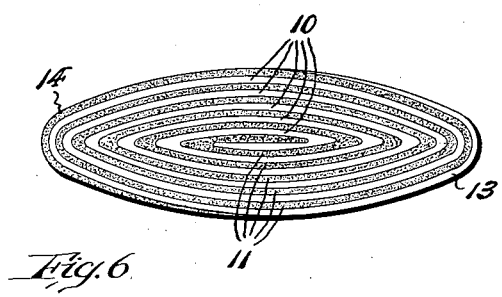
Figure 7:
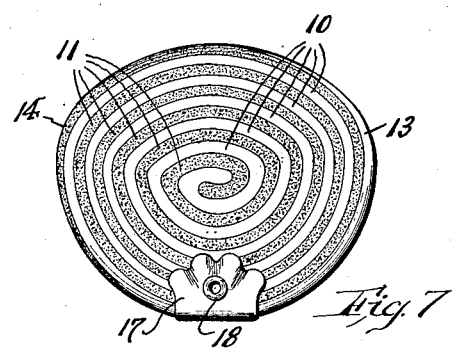

In Fig. 5 the novel composite eraser material is shown as arranged to produce a body of initially polygonal peripheral shape; in Fig. 6 the novel composite eraser material is shown as arranged to provide a body of elliptical configuration; and in Fig. 7, the novel material is shown as arranged to produce an irregular peripherally shaped body, which, if desired, may be provided with a marginal metallic holder clip 17, riveted as at 18, or otherwise secured thereto. It will be noted that the eraser bodies utilizing the novel composite structure according to this invention may be made not only in various shapes and sizes, but may be supplied with or without side plates, holders or the like.

It may here be pointed out that by treating the materials composing the respective layers 10 and 11 with pigments of selected color, various color effects may be attained, and especially when employing contrasting colors for the different layers, an eraser body of very striking and pleasing appearance is produced.

In making use of the novel composite eraser, the user may quickly select and apply to the surface to be erased an exposed peripheral section or segment of erasive material of the particular quality best suited to the work to be done. In so doing the user holds the eraser so as to utilize the periphery thereof in the usual way without necessity for tipping or holding the same in any unusual or awkward position. For example, the user will select and apply a section or segment of the comparatively soft and mild abrasive material for the erasure of pencil marks and carbon impressions, while for the erasure of writing ink, indelible ink and typewriter ink impressions, the user will select and apply a section or segment of the comparatively hard and strongly abrasive material. The proximity of exposed sections or segments of both the mild and strong abrasive materials at the periphery of the eraser body permits of application to the surface to be treated of that point of the body periphery where these sections adjoin, whereby the joint effect of the two materials may be combined for intermediate degrees of abrasive action which is frequently found to be of considerable advantage, and which results in a very clean erasure with minimum detrimental effect upon the paper surface.

Owing to the comparatively hard and less resilient character of ink erasive material (which usually consists of a rubber impregnated with a filler of gritty particles, such e. g. as pumice), there is always a risk, especially with eraser bodies made to include solid, integral and comparatively large masses or isolated sections of such material, that the user will bear therewith so heavily upon the paper to be erased, particularly when hurrying the operation, as to cause undue disintegration of the paper or unnecessarily deep scratching of the surface thereof, not infrequently to the extent of perforating the paper and spoiling the work. The composite eraser according to this invention, however, due to the novel relative arrangement and distribution of respective soft and hard erasive materials in alternated comparatively thin bodied strata, is especially adapted to substantially eliminate the risks above referred to when employing the hard and strongly abrasive material, for the reason that a peripherally exposed section of the latter material is furnished in small mass resiliently backed or cushioned by an underlying layer or stratum of the soft mild erasive material. As a consequence of such novel relative disposition of the respective materials, the hard and strongly abrasive material, when pressed to the paper surface, is resiliently and yieldably supported so that undue digging into the paper surface is prevented, while nevertheless full advantage of the erasive effect of the strong abrasive elements of the material is attained, and in fact such flattening of the latter material, as pressed upon the paper, occurs as to result in a greater area of meeting of the surfaces of the material and paper, which in and of itself produces a more uniform and even distribution of abrasive action operative to eliminate tendency to digging and deep scratching effects. The above described functional advantage is deemed one of the outstanding and most important features of this invention, the same being directly due to the novel form and relative arrangement of the respective erasive materials as disposed in alternate and comparatively thin bodied strata throughout the unitary mass of the eraser body.

While certain illustrative forms of the novel eraser bodies are shown in the drawing and above described, wherein the alternated strata of the different erasive materials are specified as arranged in spirally extending disposition, it will be obvious that, in the broader aspects of this invention, and especially with respect to the attainment of the functional advantages involved in the resilient cushioning of a layer of hard abrasive material by an underlying layer of the comparatively soft material, other specific dispositions or symmetrical arrangements of the alternated strata may be utilized.

It will also be understood that it is not intended to limit the invention to the described arrangement involving alternation of but two qualities of erasive materials, since it is deemed within the scope of the invention to utilize two or more strips of erasive materials of respectively different qualities or of respectively different degrees of abrasive effect or strength.

Since the above indicated and no doubt other changes could be made in the novel composite eraser structure above set forth, and many apparently widely different embodiments of this invention could be made without departing from the scope thereof; it is intended that all matter contained in the above description or shown in the accompanying drawing shall be interpreted as illustrative and not in a limiting sense.

I claim:—

1. A composite eraser, comprising a strip formed by superimposed relatively thin layers of soft erasive material and comparatively hard and strongly abrasive erasive material, said strip being rolled endwise upon itself and united to provide alternated spirally disposed strata of the different materials extending outwardly from a central portion of the eraser body, and outer end portions of the individual strata being disposed along the free periphery of the eraser body in circumferentially spaced relation to thereby form alternated exposed peripheral segments of hard and soft material and so that initially, and as the eraser body is consumed in use, exposed segments of the comparatively hard material are resiliently cushioned by an underlying strata of soft material.

2. A composite eraser, comprising a strip formed by superimposed relatively thin layers of soft erasive material and comparatively hard and strongly abrasive erasive material, said strip being rolled endwise upon itself and united to provide alternated spirally disposed strata of the different materials extending outwardly from a central portion of the eraser body, and outer end portions of the individual strata being disposed along the free periphery of the eraser body in circumferentially spaced relation to thereby form alternated exposed peripheral segments of hard and soft material and so that initially, and as the eraser body is consumed in use, exposed segments of the comparatively soft material are backed and supported by an underlying strata of hard material.

3. A composite eraser, comprising superimposed relatively thin strips of soft erasive material and comparatively hard and strongly abrasive erasive material, said superimposed strips being rolled endwise and united to provide a disk having alternated spirally disposed strata of the different materials, and outer end portions of the individual strata being disposed along the free periphery of said disk in circumferentially spaced relation to thereby provide alternated exposed peripheral segments of hard and soft material, with the exposed hard material resiliently cushioned by an underlying strata portion of the soft material and the exposed soft material backed and supported by an underlying strata portion of the hard material.

RUSSELL S. HENDERSON.